D. McCOMB.

Improvement in the Method of Securing Metallic Ties Around Cotton-Bales.

No. 4,993. Reissued July 16, 1872.

Attest.

G. M. Shuey.
Jeremiah Twohig.

Inventor,

Mary Ann McComb
adrix &c. by
Fisher & Fisher. attys.

AM. PHOTO-LITHOGRAPHIC CO. N.Y. (OSBORNE'S PROCESS.)

UNITED STATES PATENT OFFICE.

MARY ANN McCOMB, OF MEMPHIS, TENNESSEE, ADMINISTRATRIX OF THE ESTATE OF DAVID McCOMB, DECEASED.

IMPROVEMENT IN METHODS OF SECURING METALLIC TIES AROUND COTTON-BALES.

Specification forming part of Letters Patent No. 15,142, dated June 17, 1856; extended seven years; reissue No. 4,993, dated July 16, 1872.

Specification describing an Improvement in Metallic Ties for Cotton-Bales, invented by DAVID McCOMB, now deceased, late of Memphis, in the county of Shelby and State of Tennessee.

The invention of the said McCOMB consists in the employment of a slotted link for the purpose of fastening the hooked ends of iron hoops or bands on hay, hemp, or cotton bales, or other packages, in such manner that the expansive force of the bale, which tends to open the hooks, shall create a vertical pressure upon the ends, which shall prevent them from opening. It is believed that the said DAVID McCOMB was the first to fasten metallic hoops around cotton-bales without riveting by means of hooks in the ends of the hoops, that he was the first to use such hoops in connection with a slotted link, and that he was also the first to employ the expansive force of the bale in any manner to keep such hooks from opening.

To enable those skilled in the art to make and use said invention, the following description is given of the construction of the link and the preferred form of its application.

Figure 1:
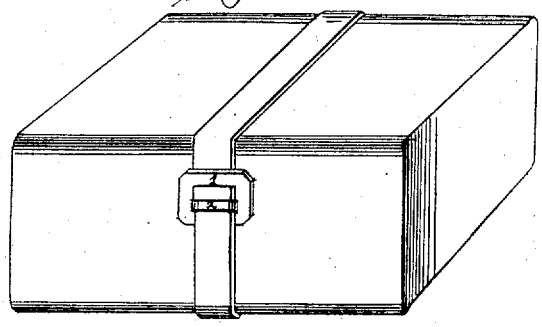
Figure 2:
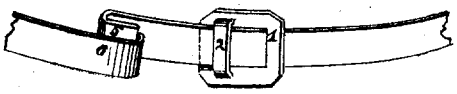
Figure 3:
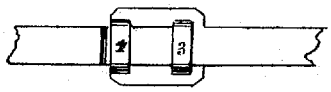

In the drawing, Figure 1 represents a cotton-bale bound with a metallic hoop having its ends united by a slotted link. Fig. 2 represents the hooked ends of the hoop with the slide withdrawn; and Fig. 3 represents a plan, and Fig. 4 a sectional view of the slide in position.

Figure 4:
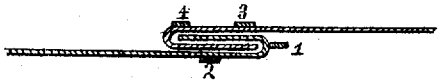

The hoop is cut to any desired length, and a hook is formed on each end by bending it over, as shown at 5 and 6 in Fig. 2. The band being put in position around the bale, the ends are hooked together by the hooks. It is obvious that these hooks are at first liable to become disengaged, and that as the bale is relieved from pressure the strain upon the bands would open the hooks and destroy the fastening. To obviate both difficulties a slotted link, shown in all the figures, consisting of four bars, marked 1, 2, 3, and 4, is slipped over the combined hooks, as shown in Fig. 4. This link would slip off again as soon as the bale was turned over if it were not for the fact that the expansion of the bale so far opens the hooks on the ends of the bands as to force them against the bars of the link and thus bind them securely together. For the purpose of preventing the link from dropping down too far when being adjusted to the bands and before the expansion of the bale binds it in place, a bar, marked 1, Figs. 1, 2, and 4, is so arranged as to slide close to the band and fall against but not over the hook of the opposite band, as shown in Fig. 4.

With this improved tie bales are made much more rapidly, the full strength of the iron is employed, there being no rivet-holes to weaken it, and the bales are kept in better condition, and are much more secure from the danger of destruction by fire or damage by water, than when bound with rope.

What is claimed as the invention of the said DAVID McCOMB is—

1. A slotted link, in combination with the hooked ends of metallic ties, for the purpose of keeping them in place and assisting in preventing the opening of the hooks with the expansive force of the bales.

2. The method of baling cotton and like material by means of a slotted link or tie-plate and metallic ties having their ends bent into hooked form and held in position by said link and the expansive force of the bale when released from pressure.

MARY ANN McCOMB,
*Administratrix.*

Witnesses:
JNO. H. LENOW,
J. E. FROST.